United States Patent
Thommes

Patent Number: 6,158,936
Date of Patent: Dec. 12, 2000

[54] SELF RETAINING NUT

[76] Inventor: Friedrich Thommes, 609-32 Ontario St., Kingston, Ontario, Canada, K7L 2Y1

[21] Appl. No.: 09/425,014

[22] Filed: Oct. 25, 1999

Related U.S. Application Data

[60] Provisional application No. 60/140,819, Jun. 28, 1999.
[51] Int. Cl.[7] .............................. F16B 37/08; F16B 39/34
[52] U.S. Cl. ........................... 411/304; 411/292; 411/432
[58] Field of Search .................................... 411/292, 293, 411/299, 303, 304, 432

[56] References Cited

U.S. PATENT DOCUMENTS

| | | |
|---|---|---|
| 175,427 | 3/1876 | Cobb . |
| 1,020,026 | 3/1912 | Clark .................................... 411/292 |
| 1,051,188 | 1/1913 | Bandy . |
| 1,067,551 | 7/1913 | Riviere .................................... 411/293 |
| 1,258,264 | 3/1918 | Smith .................................... 411/293 |
| 1,388,610 | 8/1921 | Shertzer .................................... 411/292 |
| 1,394,778 | 10/1921 | Menchen et al. .................... 411/292 |
| 2,058,452 | 10/1936 | Hoffman . |
| 2,405,088 | 7/1946 | Clauson .................................... 411/304 |
| 3,490,508 | 1/1970 | Nelson . |

FOREIGN PATENT DOCUMENTS 1027939  4/1958  Germany .............................. 411/303

*Primary Examiner*—Neill Wilson
*Attorney, Agent, or Firm*—Patent & Tademark Services; Joseph H. McGlynn

[57] ABSTRACT

A self retaining nut which has an aperture with internal threads positioned within the aperture, and a longitudinal slot intersect at least some of the internal threads. A bowed spring is positioned within the slot and is compressed as the nut is placed on a bolt to retain the nut on a bolt.

8 Claims, 1 Drawing Sheet

SELF RETAINING NUT

This is a conversion of Provisional Ser. No. 60/140,819, filed Jun. 28, 1999.

BACKGROUND OF THE INVENTION

The present invention relates generally to fasteners, and in particular to a self-retaining nut assembly having superior means to resist loosening in a variety of applications.

DESCRIPTION OF THE PRIOR ART

In the prior art various types of nut retainers have been proposed. For example, U.S. Pat. No. 2,058,452 to Hoffman discloses a retainer comprising a washer which is secured under the head of a bolt and which is deformed as the bolt is tightened.

U.S. Pat. No. 1,051,188 to Bandy discloses a retainer comprising a curved spring retained under a nut and which is deformed as the bolt is tightened.

U.S. Pat. No. 175,427 to Cobb discloses a retainer comprising a plate which has portions that are bent into slots on the nut to retain the nut after it is tightened.

U.S. Pat. No. 3,409,508 to Nelson discloses a retainer comprising a bowed plate which engages slots in the nut to retain the nut after it is tightened.

SUMMARY OF THE INVENTION

The present invention is directed to a self retaining nut which has an aperture with internal threads positioned within the aperture, and a longitudinal slot intersect at least some of the internal threads. A bowed spring is positioned within the slot and is compressed as the nut is placed on a bolt to retain the nut on a bolt.

Accordingly, it is an object of the present invention to provide an improved self-retaining fastener.

It is a further object of the present invention to provide an improved, self-retaining fastener that is inexpensive and convenient.

It is a further object of the present invention to provide an improved, self-retaining fastener that is suitable for a variety of applications.

It is a further object of the present invention to provide an improved, self-retaining fastener that is resistant to shock, vibration, and wear.

These and other objects and advantages of the present invention will be fully apparent from the following description, when taken in connection with the annexed drawings.

DESCRIPTION OF THE PREFERRED EMBODIMENT

Figure 1:
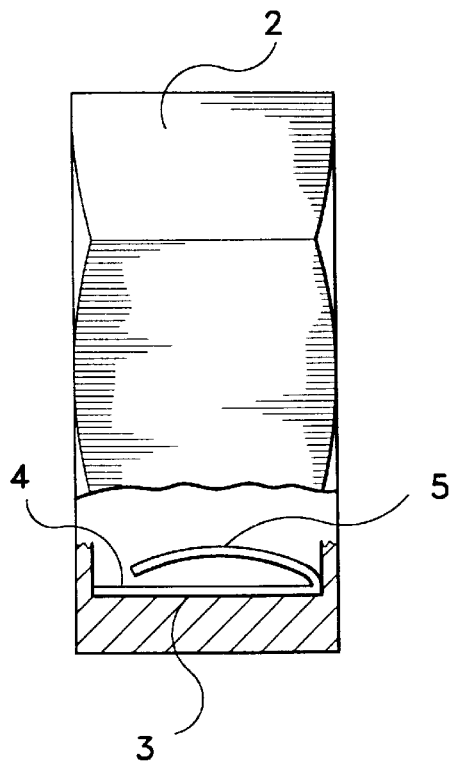
FIG. 1 is a side view of the present invention.

Referring now to the drawings in greater detail, FIG. 1 shows the self retaining nut 1 of the present invention. The nut, as shown in FIG. 1, is a conventional nut which has sides 2 and an aperture 7 (see FIG. 2) which will receive a conventional bolt. The aperture 7 has threads 6 positioned around the internal circumference of the aperture 7. It should be noted that the specific nut shown in the drawings is for illustration purposes only, and any conventional nut could be used.

Figure 2:
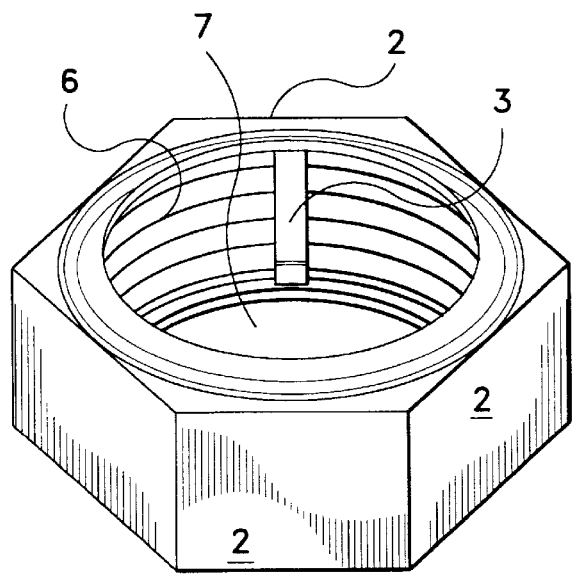
FIG. 2 is a respective view of the present invention.

As shown in FIG. 2, a slot 3 is positioned parallel with the longitudinal axis of the nut. The slot is formed to intersect at least some of the threads 6.

Figure 3:
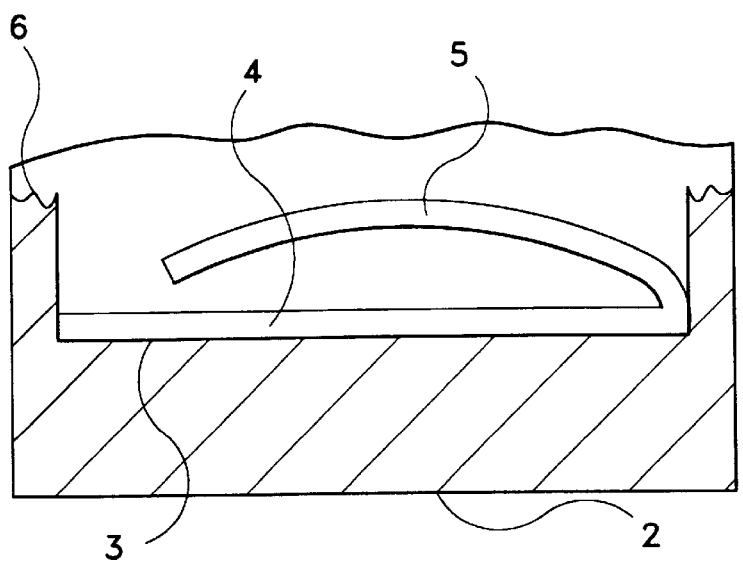
FIG. 3 is a partial view of the bowed spring used with the present invention.

As shown in FIG. 3, the slot 3 receives a spring 4, 5. The spring may have two arms, one of which, arm 4 is a straight portion which is received in the slot 3 in a friction fit. However, it should be noted that other methods of securing the arm 4 in the slot 3 can be used without departing from the scope of the invention. Connected to arm 4 may be second arm 5 which may be connected at one end of arms and is bowed to extend in an arc above arm 4. Arm 5 does not have to extend the entire length of the slot 3 as clearly shown in FIG. 3, however it should extend enough to provide a secure grip on a bolt (not shown) which is attached to the nut 1. In addition, the arm 5 should extend slightly above the screw threads 6 so it can contact the bolt as it is threaded into the nut.

As a bolt is threaded into the nut, the bolt will depress the arm 5 toward the arm 4 if 4 is present. This will provide a spring pressure on the bolt which will help prevent the bolt and nut from accidentally loosening.

The nut 1 of the present invention is designed to be used in an environment where vibrations may be a problem. Also, it could be advantageously used in an environment where extreme temperature ranges are encountered. Suggested applications for the present invention are engines, turbines, aircraft and automobile bodies, automobile wheels and steel bridges, although other environments could be found where the present invention would be advantageously used.

Although the Self Retaining Nut and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A self locking nut comprising:

a nut having an external circumference, a first surface and a second surface joined by said external circumference, an aperture extending through said nut from said first surface to said second surface, said aperture having at least one thread extending around an internal surface of said aperture, at least one slot intersecting said at least one thread, resilient means secured in said at least one slot for engaging a bolt inserted into said aperture, and wherein said resilent means is comprised of two parts, one of said two parts being secured within said at least one slot, and a second of said two parts extending out of said at least one slot, and wherein said second of said two parts is curved.

2. The self locking nut as claimed in claim 1, wherein said aperture has a plurality of threads, and said at least one slot intersects more than one of said plurality of threads.

3. The self locking nut as claimed in claim 1, wherein said one of said two parts is straight.

4. The self locking nut as claimed in claim 1, wherein said second of said two parts is bowed with a concave and a convex side, and said concave side is closer to said at least one slot than said convex side.

5. A self locking nut comprising:

a nut having an external circumference, a first surface and a second surface joined by said external circumference, an aperture extending through said nut from said first surface to said second surface, said aperture having at least one thread extending around an internal surface of said aperture, at least one slot intersecting said at least one thread, resilient means secured in said at least one slot for engaging a bolt inserted into said aperture, and wherein said resilient means has two parts, one of said two parts being secured in said at least one slot, and another of said two parts extends away from said slot and then curves back toward said slot.

6. The self locking nut as claimed in claim 5, wherein said aperture has a plurality of threads, and said at least one slot intersects more than one of said plurality of threads.

7. The self locking nut as claimed in claim 5, wherein said one of said two parts is straight.

8. The self locking nut as claimed in claim 5, wherein said another of said two parts is bowed with a concave and a convex side, and said concave side is closer to said at least one slot than said convex side.

\* \* \* \* \*